United States Patent [19]
Chang

[11] Patent Number: 6,118,600
[45] Date of Patent: Sep. 12, 2000

[54] LENS SWITCH APPARATUS

[75] Inventor: Tsang-Huai Chang, Changhua Hsien, Taiwan

[73] Assignee: Umax Data Systems Inc., Hsinchu, Taiwan

[21] Appl. No.: 09/365,775

[22] Filed: Aug. 3, 1999

[51] Int. Cl.[7] .............................. G02B 7/02; G02B 26/08; G02B 27/02
[52] U.S. Cl. ......................... 359/821; 359/819; 359/822; 359/210; 359/441
[58] Field of Search ...................................... 359/672, 802, 359/806, 810, 811, 813, 819, 821, 822, 826, 210, 381, 421, 442, 441; 355/44, 45; 369/44.18, 44.19, 44.21

[56] References Cited

U.S. PATENT DOCUMENTS

| | | | |
|---|---|---|---|
| 5,497,272 | 3/1996 | Wun ......................................... | 359/821 |
| 5,552,939 | 9/1996 | Tseng et al. .............................. | 359/821 |
| 5,576,897 | 11/1996 | Kuo ......................................... | 359/822 |
| 5,684,624 | 11/1997 | Wieber et al. ........................... | 359/384 |
| 5,712,720 | 1/1998 | Peng et al. ............................... | 359/210 |
| 5,734,477 | 3/1998 | Tsai ......................................... | 358/296 |

*Primary Examiner*—Scott J. Sugarman
*Assistant Examiner*—Saeed Seyrafi
*Attorney, Agent, or Firm*—Harold L. Novick; Nath & Associates

[57] ABSTRACT

The lens switch apparatus of present invention comprises lens mounts, lenses, a carrier, rotating axes, at least one belt, gears, motion mechanisms and the power sources. The lens mounts include the first lens mount and the second lens mount. Several lenses are positioned on the lens mounts. The carrier, on which the above lens and the lens mounts are positioned, serves as the plate to move the lens. The motion mechanism, which further includes the first motion mechanism and the second motion mechanism. The first motion mechanism move the carrier toward the first direction to focus lens properly. Besides, the second motion mechanism move the first motion mechanism toward the second direction to align lens to the optical axis. The rotating axis, which comprises the first rotating axis and the second rotating axis. Through the first rotating axis, the first lens mount is coupled to the carrier. Similarly, through the second rotating axis, the second lens mount is coupled to the carrier. The third power source, through the belt and the first gear, is coupled to the first rotating axis. Similarly, through the belt and the second gear, the third power is coupled to the second rotating axis. In this manner, the first lens mount and the second lens mount are rotated by the third power source.

21 Claims, 9 Drawing Sheets

LENS SWITCH APPARATUS

BACKGROUND OF THE INVENTION

1. Field of the Invention

The present invention relates to a lens switch apparatus, and more particularly, to the lens switch apparatus that is rotatable and moveable along X direction or Y direction.

2. Description of the Prior Art

A scanner system becomes a broadly used device, which makes use of focusing a reflected light beam through a photodetector to generate an image signal for further image processing. A conventional scanner system includes a light source, a mirror, and a lens set, which are used to guide the reflected light to an image sensor, such as CCD or CIS.

In order to provide user for several different magnifications, a high-level scanner is designed to be possessed of several lenses, which are switched by a lens switch apparatus. The desired magnification is switched by the lens switch apparatus. Due to the different magnifications, the object length, image length and focal length of each lens having different magnifications is not the same. One disadvantage of the conventional scanner is that large space is required to contain such lenses with the positions fit for their focus lengths.

Figure 1A:
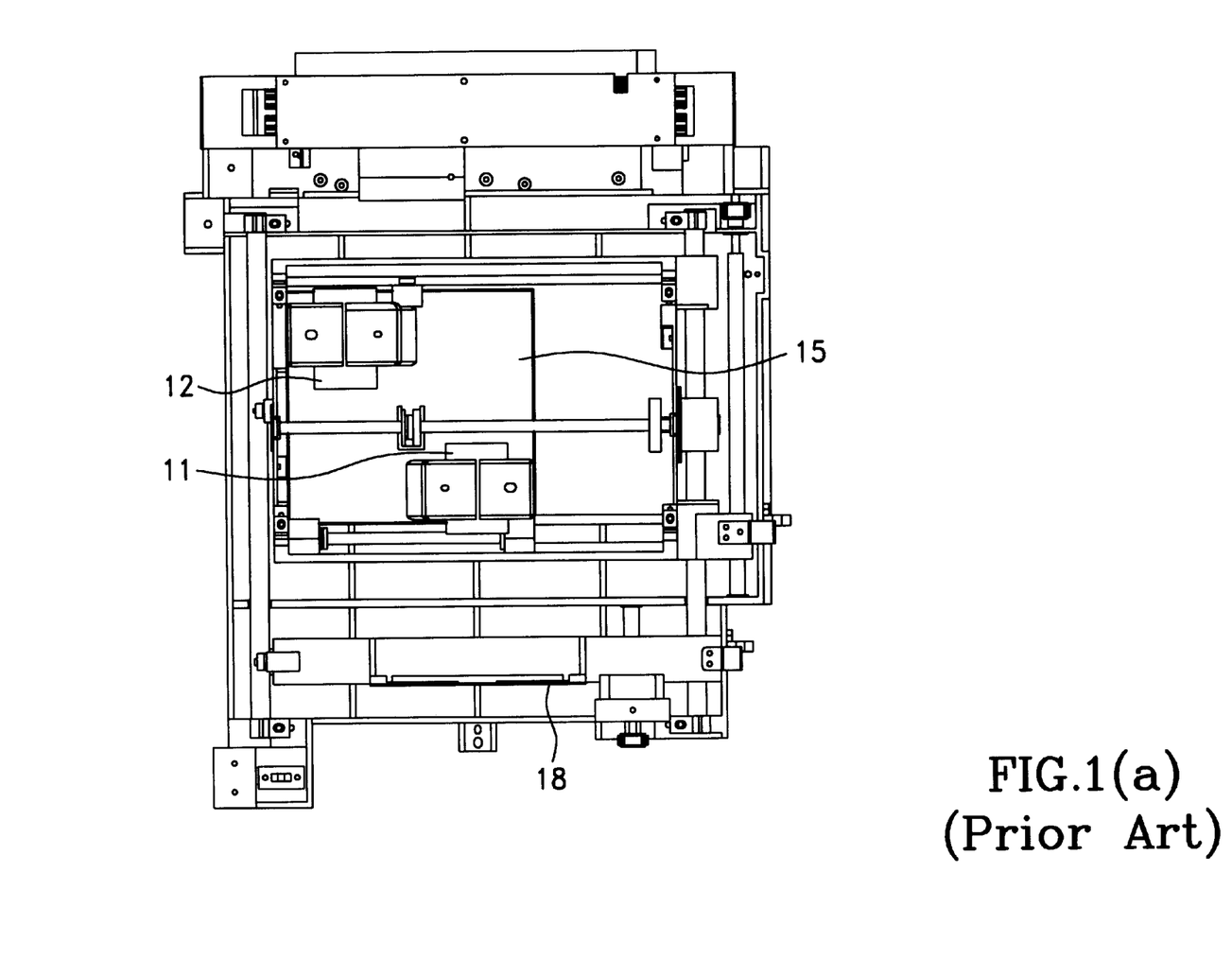
FIG. 1(a) is a top view of the conventional lens switch apparatus.
Figure 1B:
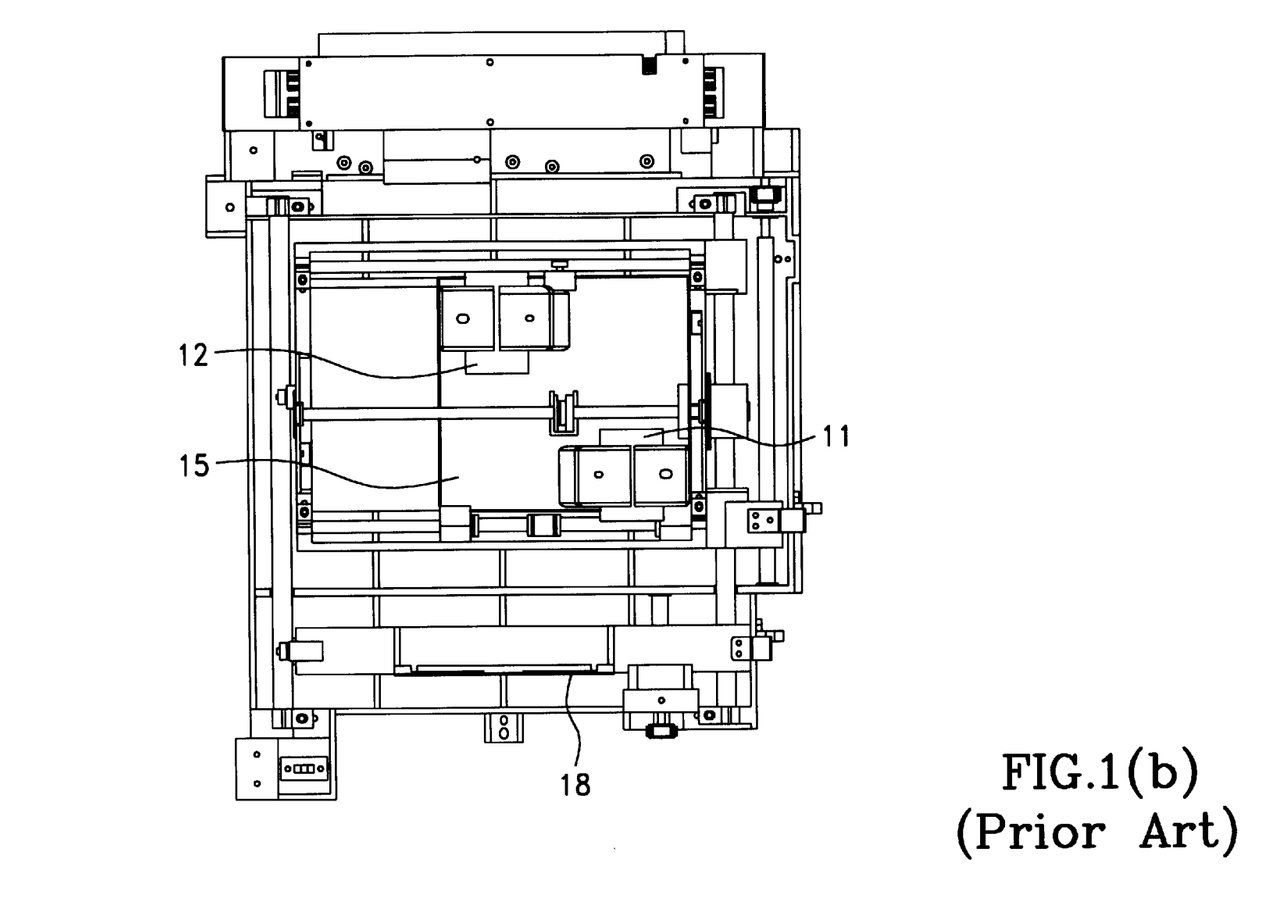
FIG. 1(b) shows the configuration after the carrier moving toward the right direction.

Referring to FIG. 1(a), which is the top view of a conventional lens switch apparatus, The lens switch apparatus includes a first lens 11, a second lens 12 and a carrier 15. The first lens 11 and the second lens 12, which are positioned on the carrier 15, have a first magnification and a second magnification, respectively. Owing to the magnifications of these lenses are different, the first lens 11 and the second lens 12 are not positioned on the same level. Thus, It results in too large area of the carrier 15. Besides, the carrier 15 moves toward specific direction, such as the horizontal direction in the figure, merely. When the first magnification is required, the first lens 11, on right side of the FIG. 1(a), is aligned to the image sensor 18. While the second magnification is desired, the carrier 15 moves toward the right direction to align the second lens 12 to the image sensor 18. Referring to FIG. 1(b), which depicts the configuration after the carrier 15 moving toward the right direction. Large volume for a scanner is thus needed because the carrier 15 occupies large space for required moving. Moreover, the more the number of lens is, the larger volume of lens switch apparatus requires.

Figure 2:
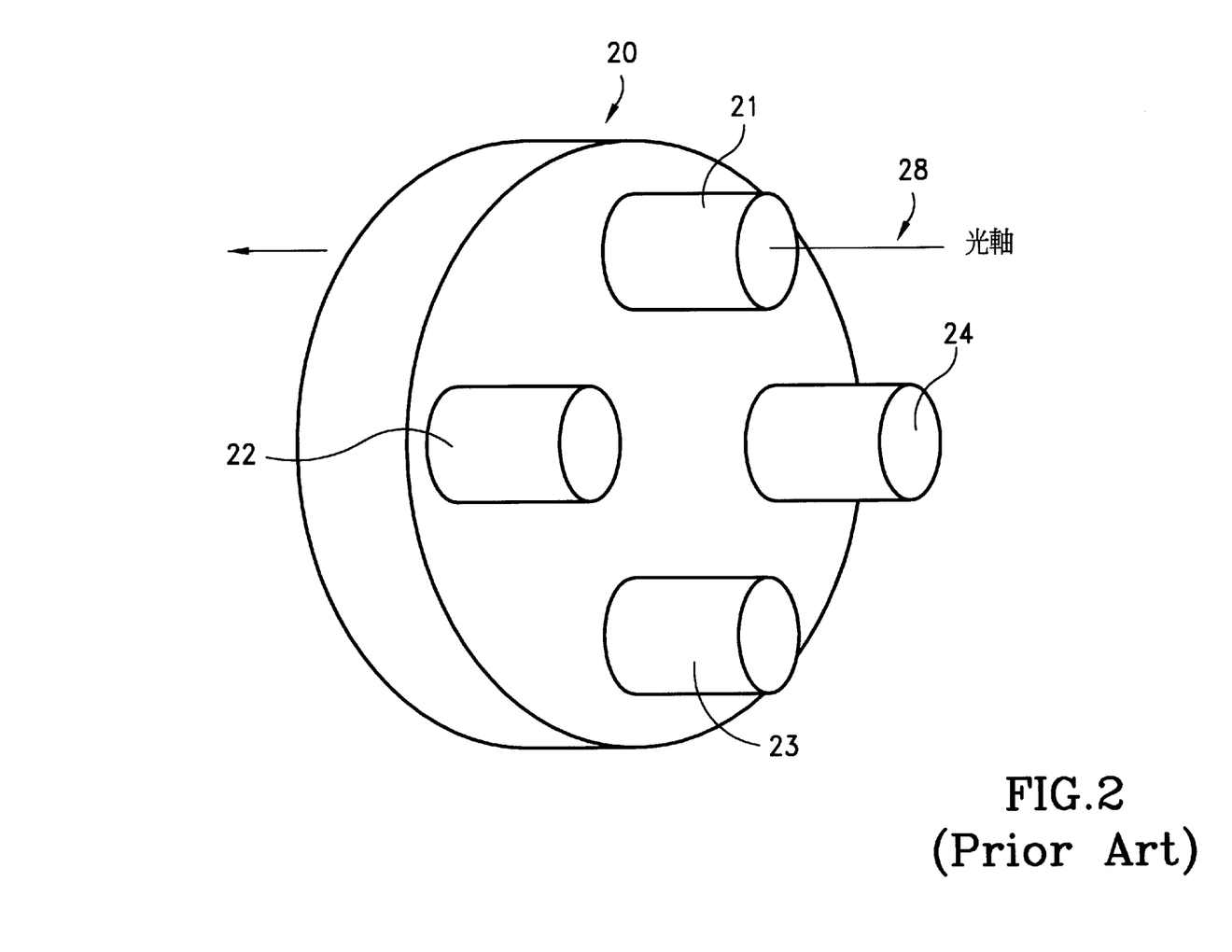
FIG. 2 is another conventional lens switch apparatus.

Referring to FIG. 2, which depicts another conventional lens switch apparatus, a round plate is rotated to switch the lens. Several lenses, such as the first lens 21, the second lens 22, the third lens 23, the fourth lens 24, are positioned on the round plate 20. The magnifications of the first lens 21, the second lens 22, the third lens 23 and the fourth lens 24 are the first magnification, the second magnification, the third magnification and the fourth magnification, respectively. In the beginning, the first lens 21 is on the top and aligns to the optical axis 28. While the third magnification is desired, the round plate 20 rotates to make the third lens 23 align to the optical axis 28. The drawback of above mentioned round plate 20 is that large space and large mechanical volume are unavoidable.

SUMMARY OF THE INVENTION

The lens switch apparatus of present invention comprises lens mounts, lenses, a carrier, rotating axes, at least one belt, gears, motion mechanisms and the power source. The lens mounts include the first lens mount and the second lens mount. Several lenses, include the first lens, the second lens, the third lens and the fourth lens, are positioned on the lens mounts. Each of the lens mounts includes at least one lens and the magnification of each lens is different. The first lens and the second lens are positioned on the first lens mount. The third lens and the fourth lens are positioned on the second lens mount. The carrier, on which the above lenses and the lens mounts are positioned, serves as the plate to move the lenses.

The lens switch apparatus of present invention also includes the motion mechanism, which further includes the first motion mechanism and the second motion mechanism. The first motion mechanism includes the first lead screw and the first power source. The second motion mechanism includes the second lead screw, the shaft and the second power source. Through the first lead screw, the carrier is coupled to one side of the first motion mechanism. Similarly, through the second lead screw and the shaft, the another side of the first motion mechanism is coupled to the second motion mechanism. Moreover, the first power source, which is coupled to the first lead screw, is used to provide the required power that the carrier moves toward the first direction. Similarly, the second power source, which is coupled to the second lead screw, is used to provide the required power that the first motion mechanism moves toward the second direction. That is to say, the first motion mechanism drives the carrier toward the first direction to make a selected lens align to the optical axis. Besides, the second motion mechanism drives the first motion mechanism toward the second direction to focus a selected lens properly. In this embodiment, the second direction, which is vertical to the first direction, is parallel to the optical axis. The surface of the first lead screw and that of the second lead screw have threads, which is used to drive the carrier and the first motion mechanism, respectively. The shaft has smooth surface, however, which is used merely to lead the element coupled with the shaft to move toward the direction smoothly and precisely.

The rotating axes of the invention comprise the first rotating axis and the second rotating axis. Through the first rotating axis, the first lens mount is coupled to the carrier. Similarly, the second lens mount is coupled to the carrier through the second rotating axis.

The lens switch apparatus of present invention also includes the third power source. Through the belt and the first gear, the third power is coupled to the first rotating axis. Similarly, the third power is coupled to the second rotating axis through the belt and the second gear. In this manner, the first lens mount and the second lens mount are rotated by the third power source.

Right now, the process how the lens switch apparatus switch the lens is described. In the beginning, the first lens is used. If the third lens is desired, the first lens mount is rotated away from the optical axis and then, through the second rotating axis, the second lens mount is rotated to align the third lens to the optical axis. If the third lens is not precisely aligned to the optical axis, the carrier is moved along the first direction to align the third lens to the optical axis. Finally, the carrier is moved toward the second direction to precisely focus third lens the on the image sensor.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 3A:
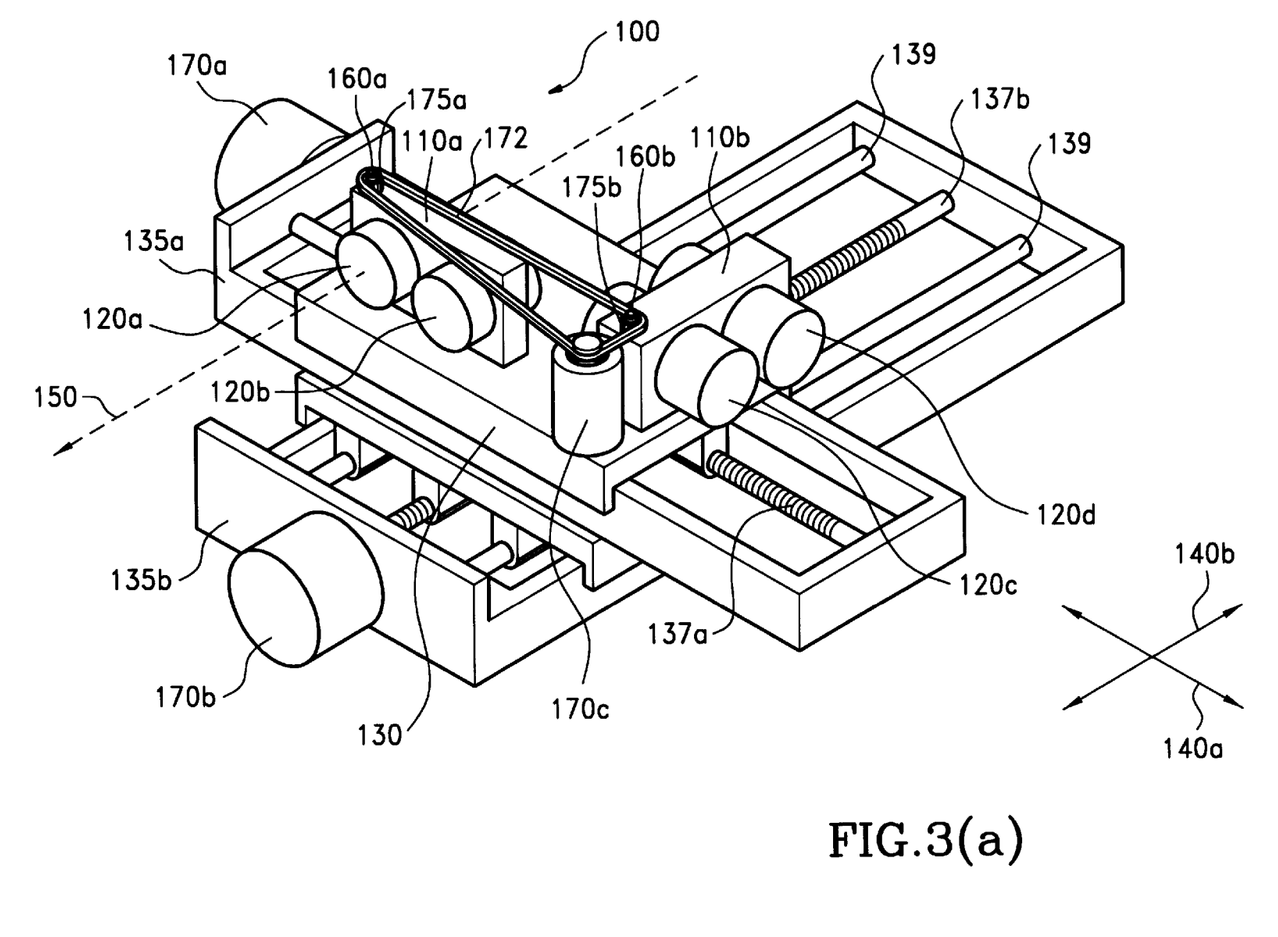
FIG. 3(a) depicts one embodiment of the present invention.

Referring to FIG. 3(a), which shows the lens switch apparatus 100 of present invention, the lens switch apparatus 100 comprises lens mounts, lenses, a carrier, rotating axes, at least one belt, gears, motion mechanisms and powers. The combination and respective function of the above elements are described as follow. The lens mounts include the first lens mount 110a and the second lens mount 110b. Several lenses, including the first lens 120a, the second lens 120b, the third lens 120c and the fourth lens 120d, are positioned on the lens mounts. Each of the lens mounts includes at least one lens and the magnification of each lens is different. The first lens 120a and the second lens 120b are positioned on the first lens mount 110a. The third lens 120c and the fourth lens 120d are positioned on the second lens mount 110b. The carrier 130, on which the above lenses and the lens mounts are positioned, serves as the plate to move the lens.

Still referring to FIG. 3(a), the lens switch apparatus 100 of present invention also comprises the motion mechanism, which includes the first motion mechanism 135a and the second motion mechanism 135b. The first motion mechanism 135a includes the first lead screw 137a and the first power source 170a. The second motion mechanism 135b includes the second lead screw 137b, the shaft 139 and the second power source 170b. Through the first lead screw 137a, the carrier 130 is coupled to one side of the first motion mechanism 135a. Similarly, through the second lead screw 137b and the shaft 139, the another side of the first motion mechanism 135a is coupled to the second motion mechanism 135b. Moreover, the first power source 170a, which is coupled to the first lead screw 137a, is used to provide the required power that the carrier 130 moves toward the first direction 140a. Similarly, the second power source 170b, which is coupled to the second lead screw 137b, is used to provide the required power that the first motion mechanism 135a moves toward the second direction 140b. That is to say, the first motion mechanism 135a move the carrier 130 toward the first direction 140a to align lens to the optical axis 150. Besides, the second motion mechanism 135b move the first motion mechanism 135a toward the second direction 140b to focus lens properly. In this embodiment, the second direction 140b, which is vertical to the first direction 140a, is parallel to the optical axis 150. The surface of the first lead screw 137a and that of the second lead screw 137b have threads, which is used to drive the carrier 130 and the first motion mechanism 135a, respectively. The shaft 139 has smooth surface, however, which is used to lead the element coupled with the shaft 139 to move toward the direction smoothly and precisely. As noted, the shaft 139 may be not necessary and could be omitted.

Still referring to FIG. 3(a), the lens switch apparatus 100 of present invention also includes the rotating axes, which comprises the first rotating axis 160a and the second rotating axis 160b. Through the first rotating axis 160a, the first lens mount 110a is coupled to the carrier 130. Similarly, through the second rotating axis 160b, the second lens mount 110b is coupled to the carrier 130.

Figure 4:
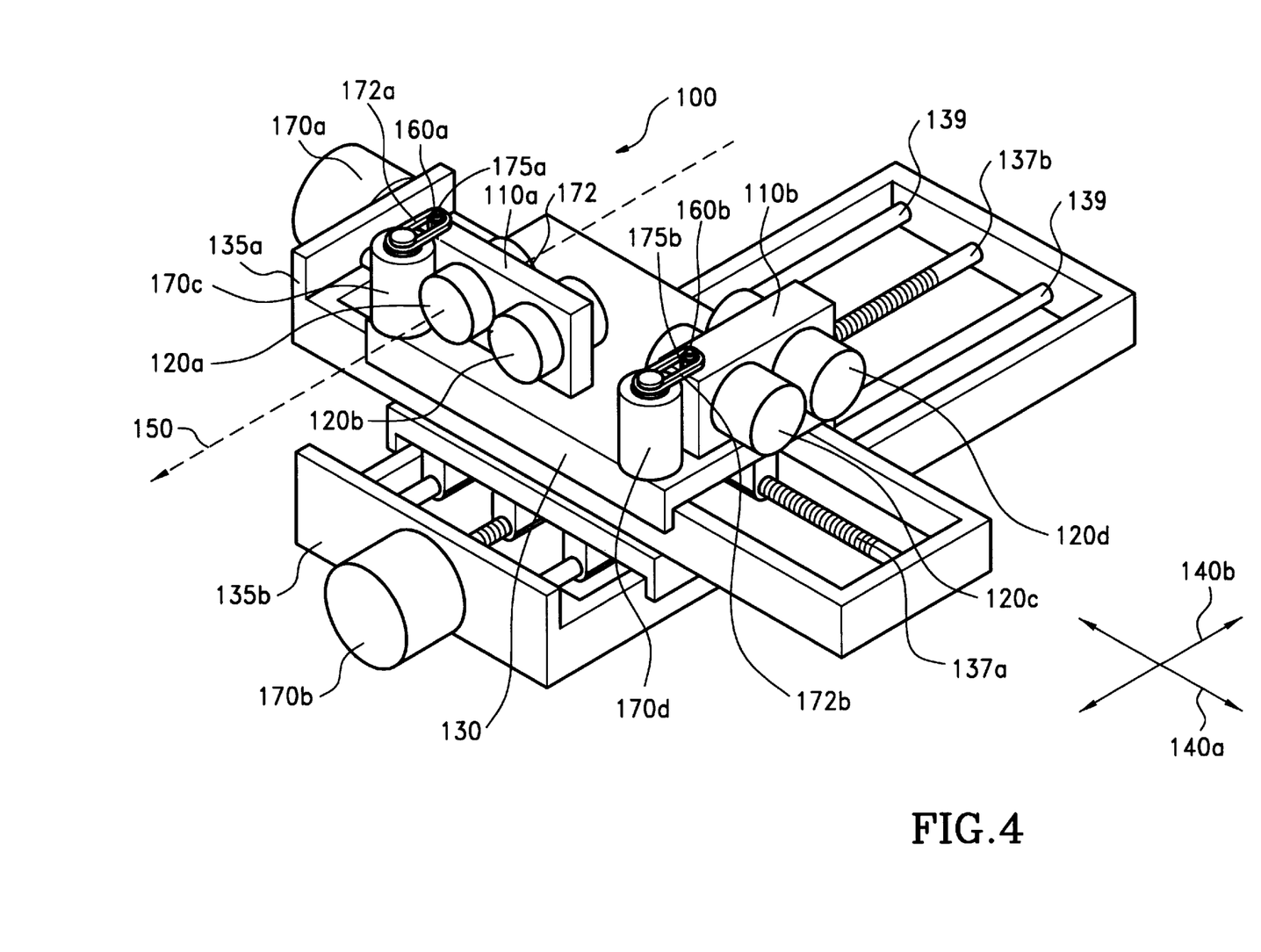
FIG. 4 depicts another embodiment of the present invention.

Still referring to FIG. 3(a), the lens switch apparatus 100 of present invention also includes the third power source 170c. Through the belt 172 and the first gear 175a, the third power 170c is coupled to the first rotating axis 160a. Similarly, through the belt 172 and the second gear 175b, the third power 170c is coupled to the second rotating axis 160b. In this manner, the first lens mount 110a and the second lens mount 110b are rotated by the third power source 170c. In this preferred embodiment, the third power source 170c includes a motor, such as a step motor or a DC motor. It's worthy noting that in this embodiment, the power source, the third power source 170c, coupled to the first lens mount 110a and that coupled to the second lens mount 110b are the same one. However, in another embodiment, as shown in FIG. 4, the third power source 170c is coupled to the first lens mount 110a and the fourth power source 170d is coupled to the second lens mount 110b. To describe more detail, the third power source 170c is coupled to the first lens mount 110a through the first belt 172a and the first gear 175a; the fourth power source 170d is coupled to the second lens mount 110b through the second belt 172b and the second gear 175b. In this embodiment, the third power source 170c and the fourth power source 170d are called rotating power source. Moreover, the number of rotating power source is equal to that of lens mounts.

Figure 3B:
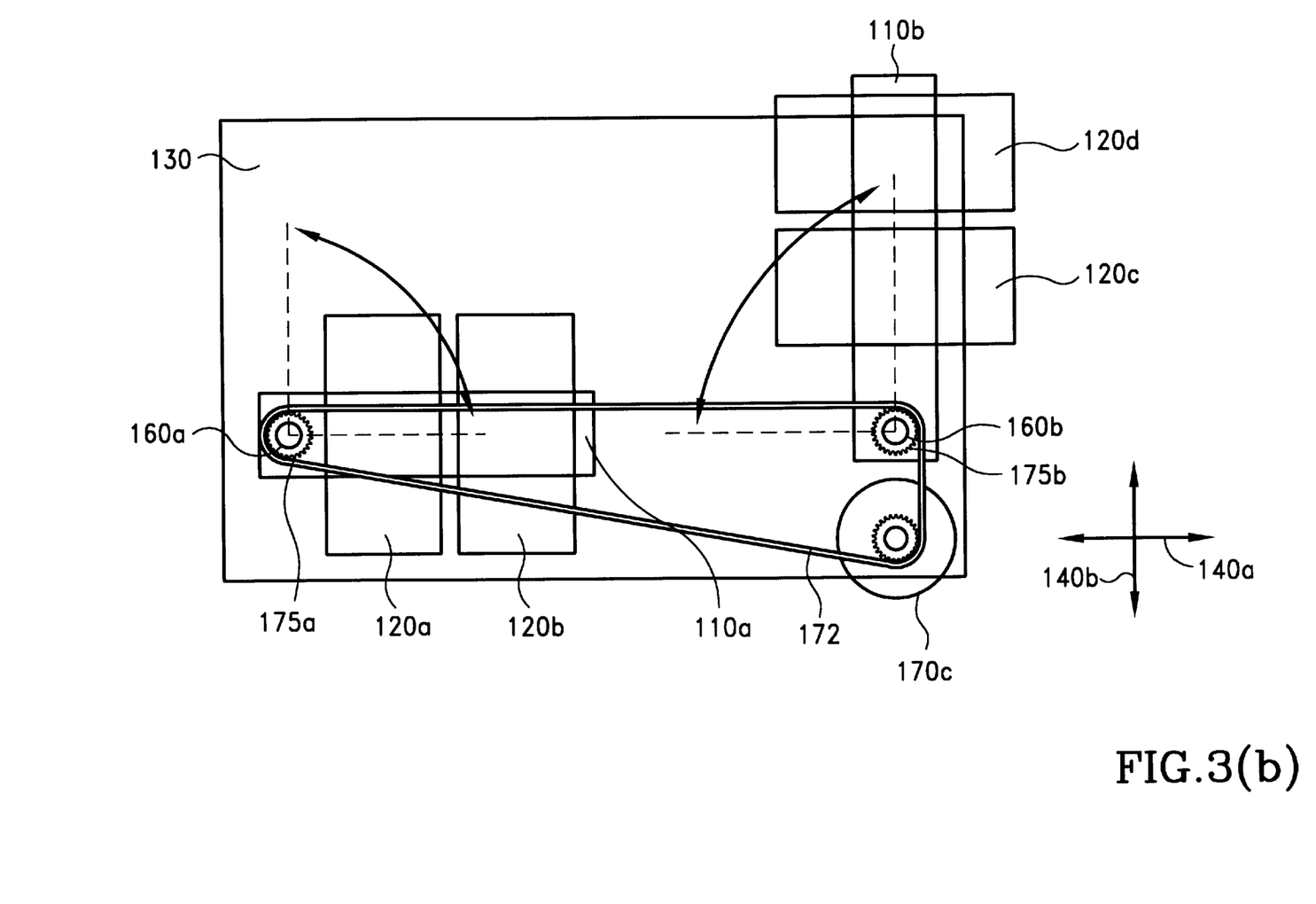
FIG. 3(b) is a top view of the present invention.

Referring to FIG. 3(b), which depicts the top view of the lens switch apparatus 100 of present invention, wherein 160a and 160b indicate the first rotating axis and the second rotating axis, respectively; label 170(c) indicates the third power; label 172 indicates the belt. Finally, label 175a and label 175b indicate the first gear and the second gear, respectively. As shown in the FIG. 3(b), through the belt 172 and the first gear 175a, the third power 170c is coupled to the first rotating axis 160a to rotate the first lens mount 110a. Similarly, through the belt 172 and the second gear 175b, the third power 170c is coupled to the second rotating axis 160b to rotate the second lens mount 110b.

Figure 3C:
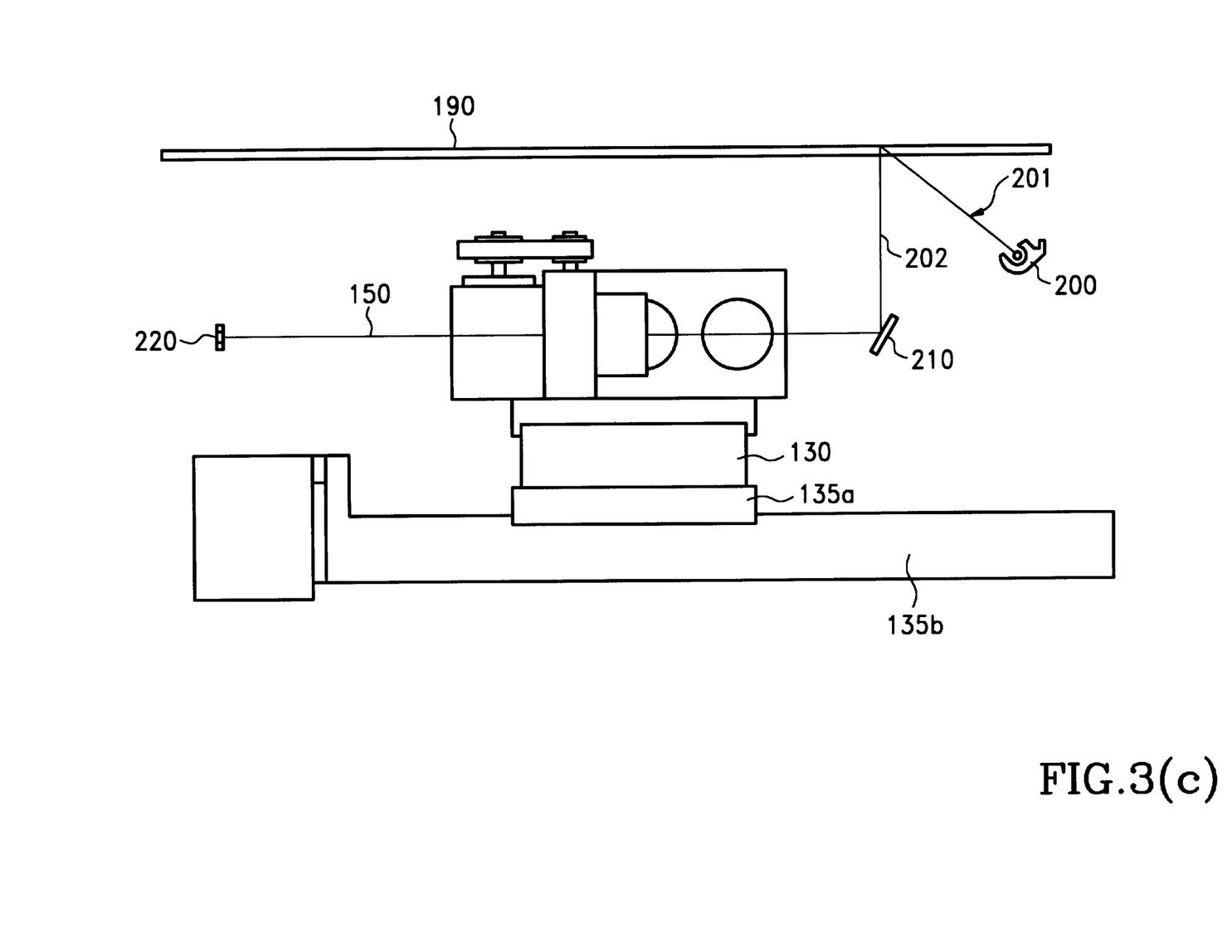
FIG. 3(c) shows a cross section view of the present invention used for a scanner.
Figure 3D:
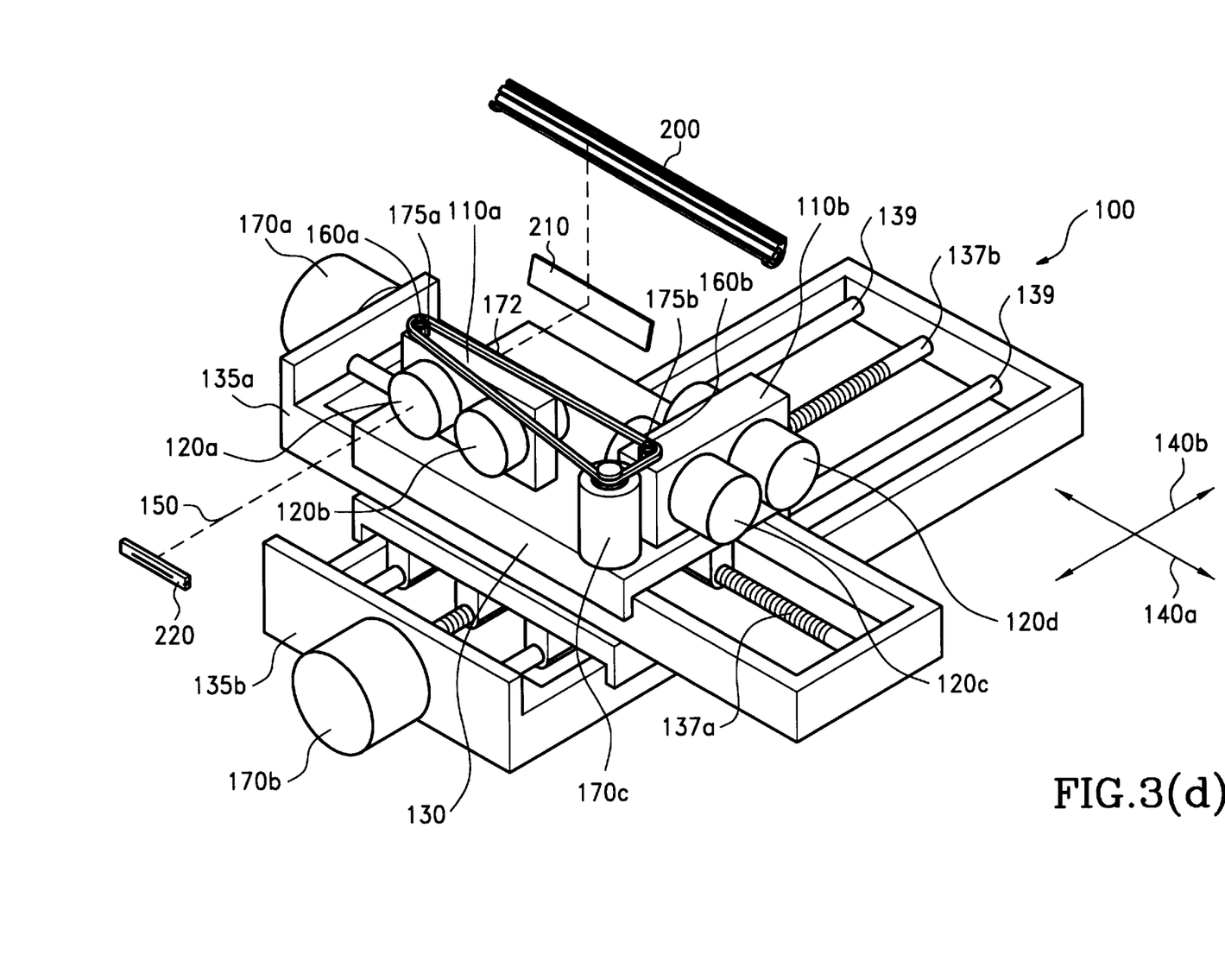
FIG. 3(d) illustrates a three-dimensional picture of the present invention used for a scanner.

Referring to FIG. 3(c) and FIG. 3(d) simultaneously, which depict the embodiment that the lens switch apparatus is used in a scanner. As noted, the embodiment is illustrated to describe the present invention rather than limiting the scope of the present invention. Turing to the FIG. 3(c) firstly, a document (not shown) desired to scan is placed on a transparent plate 190, such as the glass plate. A light source 200 emits the incident light 201 onto the document desired to scan, and then the reflected light 202 from the document is reflected by the mirror 210. After the reflection resulted from the mirror 210, the reflected light 202 moves forward, along the optical axis 150, to the lens, such as the first lens 120a shown in the FIG. 3(d). Through the lens, the reflected light 202 forms an image on the image sensor 220, such as CCD or CIS. Then, the image sensor 220 output a signal to another signal process device (not shown) for further processing. The elements 135a and 135b shown in the FIG. 3(c) indicate the first motion mechanism and the second motion mechanism, respectively.

Figure 3E:
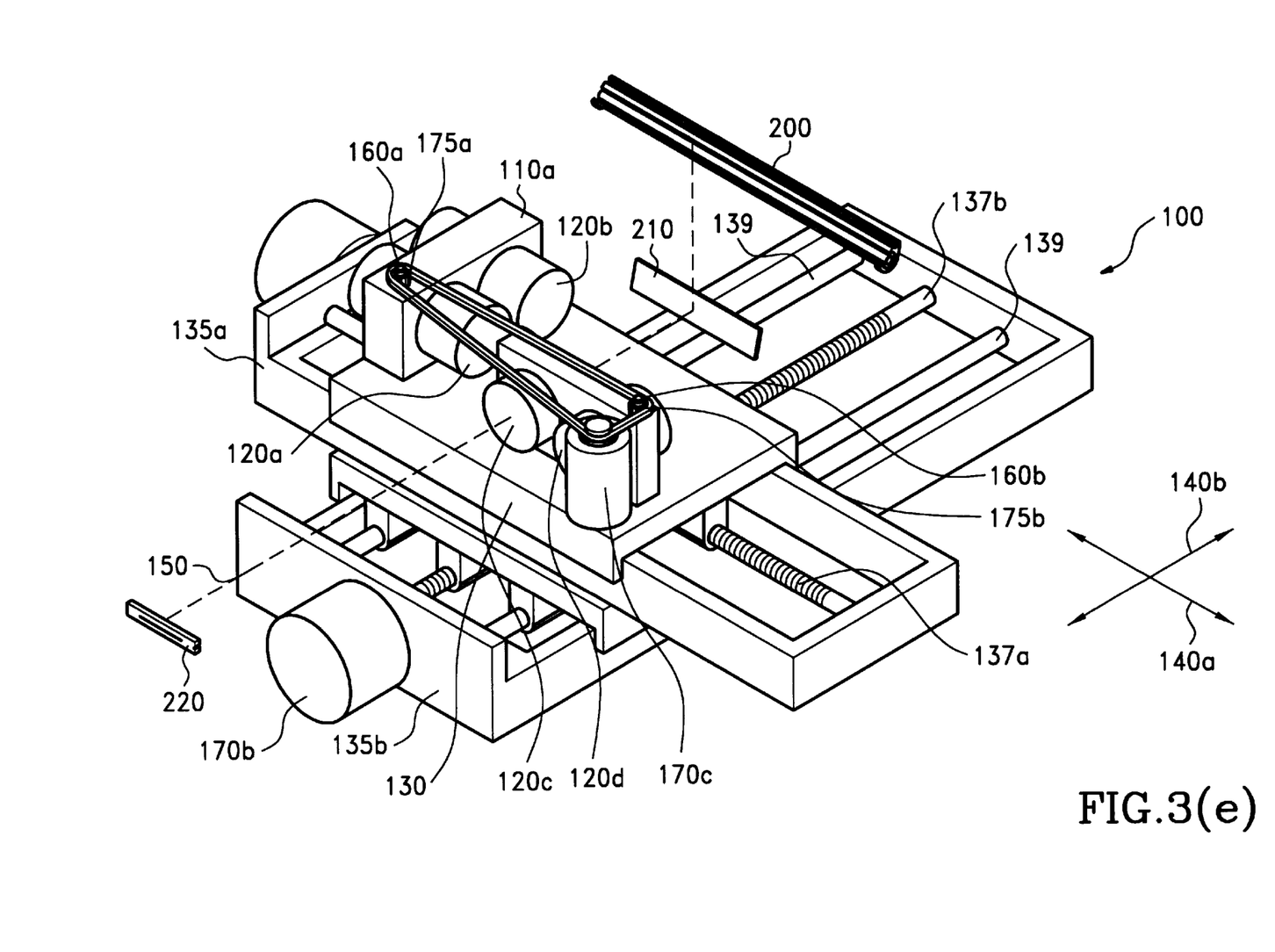
FIG. 3(e) illustrates the process how the present invention switch lens.

Referring to FIG. 3(d) and FIG. 3(e) simultaneously, which depict how the lens switch apparatus 100 switch the lens. In the beginning, the first lens 120a is used. If the third lens 120c is desired, the first lens mount 110a is rotated away from the optical axis 150 and then, through the second rotating axis 160b, the second lens mount 110b is rotated to align the third lens 120c to the optical axis 150. If the third lens 120c is not precisely aligned to the optical axis 150, the carrier 130 is moved along the first direction 140a to align the third lens 120c to the optical axis 150. Finally, the carrier 130 is moved toward the second direction 140b to precisely focus third lens 120c the on the image sensor 220.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A lens switch apparatus for switching lens comprises:
   a plurality of lenses, each said lenses has different magnification;
   a plurality of lens mounts, comprising a first lens mount and a second lens mount, each of said lens mounts including at least one of said lenses;
   a carrier, comprising said lens mounts, said carrier being able to move toward a first direction and a second direction, said first direction is vertical to said second direction;
   a plurality of rotating axes, comprising the first rotating axis and the second rotating axis, said first lens mount is coupled to the carrier through said first rotating axis and said second lens mount is coupled to the carrier through said second rotating axis;
   a first motion mechanism, coupled to said carrier, used to move said carrier toward said first direction;
   a second motion mechanism, coupled to said first motion mechanism, used to move said first motion mechanism toward said second direction; and
   a rotating power source, coupled to said rotating axes and providing required power to rotate said lens mounts.

2. The lens switch apparatus according to claim 1, wherein said first motion mechanism includes a first lead screw and a first power source, and said first motion mechanism is coupled to said carrier by said first lead screw to move said carrier.

3. The lens switch apparatus according to claim 1, wherein said second motion mechanism includes a second lead screw and a second power source, and said second motion mechanism is coupled to said carrier by said second lead screw to move said carrier.

4. The lens switch apparatus according to claim 1, wherein said second motion mechanism includes said shaft.

5. The lens switch apparatus according to claim 1, wherein said third power source is coupled to each of said rotating axis through a gear and a belt.

6. The lens switch apparatus according to claim 1, wherein said third power source includes at least one motor.

7. A lens switch apparatus for switching lens comprises:
   a plurality of lens, each said lenses has different magnification;
   a plurality of lens mounts, comprising a first lens mount and a second lens mount, each of said lens mounts including at least one said lens;
   a carrier, comprising said lens mounts, said carrier being able to move toward a first direction and a second direction, said first direction is vertical to said second direction;
   a plurality of rotating axes, comprising the first rotating axis and the second rotating axis, said first lens mount is coupled to the carrier through said first rotating axis and said second lens mount is coupled to the carrier through said second rotating axis;
   a first motion mechanism, which includes a first lead screw and a first power source, said first motion mechanism is coupled to said carrier by said first lead screw to move said carrier toward said first direction;
   a second motion mechanism, which includes a second lead screw and a second power source, said second motion mechanism is coupled to said first motion mechanism by said second lead screw to move said first motion mechanism toward said second direction; and
   a third power source, coupled to said rotating axis and providing required power to rotate said lens mounts.

8. The lens switch apparatus according to claim 7, wherein said second motion mechanism includes said shaft.

9. The lens switch apparatus according to claim 7, wherein said third power source is coupled to each said rotating axes through a gear and at least one belt.

10. The lens switch apparatus according to claim 7, wherein said third power source includes a motor.

11. A lens switch apparatus for switching lens comprises:
    a plurality of lenses, each of said lenses has different magnification;
    a plurality of lens mounts, comprising a first lens mount and a second lens mount, each of said lens mounts including at least one of said lenses;
    a carrier, comprising said lens mounts, said carrier is able to move toward a first direction and a second direction, said first direction is vertical to said second direction;
    a plurality of rotating axes, comprising a first rotating axis and a second rotating axis, said first lens mount is coupled to the carrier through said first rotating axis and said second lens mount is coupled to the carrier through said second rotating axis;
    a first motion mechanism, which includes a first lead screw and a first power source, said first motion mechanism is coupled to said carrier by said first lead screw to move said carrier toward said first direction;
    a second motion mechanism, which includes a second lead screw and a second power source, said second motion mechanism is coupled to said first motion mechanism by said second lead screw to move said first motion mechanism toward said second direction, said second direction is parallel to the optical axis and said second direction is parallel to said first direction; and
    a third power source, used to rotate said lens mounts, said third power source coupled to said first rotating axis through a first gear and a belt, said third power source coupled to said second rotating axis through a second gear and a belt.

12. The lens switch apparatus according to claim 11, wherein said first source includes a motor.

13. The lens switch apparatus according to claim 11, wherein said second motion mechanism includes said shaft.

14. The lens switch apparatus according to claim 11, wherein said second power source includes a motor.

15. The lens switch apparatus according to claim 11, wherein said third power source includes a motor.

16. A lens switch apparatus for switching lens comprises:
    a plurality of lenses, each of said lenses has different magnification;
    a plurality of lens mounts, comprising a first lens mount and a second lens mount, each of said lens mounts including at least one of said lenses;

a carrier, comprising said lens mounts, said carrier being able to move toward a first direction and a second direction, said first direction is vertical to said second direction;

a plurality of rotating axes, comprising the first rotating axis and the second rotating axis, said first lens mount is coupled to the carrier through said first rotating axis and said second lens mount is coupled to the carrier through said second rotating axis;

a first motion mechanism, coupled to said carrier, used to move said carrier toward said first direction;

a second motion mechanism, coupled to said first motion mechanism, used to move said first motion mechanism toward said second direction; and a plurality of rotating power sources, coupled to said rotating axes to rotate said lens mounts, said rotating power source comprising a third power source and a fourth power source, said third power source is coupled to said first rotating axis and said fourth power source is coupled to said second rotating axis.

17. The lens switch apparatus according to claim 16, wherein said first motion mechanism includes a first lead screw and a first power source, and said first motion mechanism is coupled to said carrier by said first lead screw to move said carrier.

18. The lens switch apparatus according to claim 16, wherein said second motion mechanism includes a second lead screw and a second power source, and said second motion mechanism is coupled to said carrier by said second lead screw to move said carrier.

19. The lens switch apparatus according to claim 16, wherein said rotating power sources are coupled to each of said rotating axes through a gear and a belt.

20. The lens switch apparatus according to claim 16, wherein said third power source includes a motor.

21. The lens switch apparatus according to claim 16, wherein said fourth power source includes a motor.

* * * * *